United States Patent [19]
Szamrej

[11] Patent Number: 5,990,852
[45] Date of Patent: Nov. 23, 1999

[54] DISPLAY SCREEN DUPLICATION SYSTEM AND METHOD

[75] Inventor: Mark Szamrej, Middleville, N.Y.

[73] Assignee: Fujitsu Limited, Kawasaki, Japan

[21] Appl. No.: 08/741,807

[22] Filed: Oct. 31, 1996

[51] Int. Cl.[6] ................................................. G09G 5/12
[52] U.S. Cl. ............................................................. 345/2
[58] Field of Search ............................... 345/2, 329–331; 348/420, 421

[56] References Cited

U.S. PATENT DOCUMENTS

| | | |
|---|---|---|
| 4,651,207 | 3/1987 | Bergmann et al. . |
| 4,823,108 | 4/1989 | Pope . |
| 5,030,953 | 7/1991 | Chiang . |
| 5,241,625 | 8/1993 | Epard et al. . |
| 5,430,486 | 7/1995 | Fraser et al. . |
| 5,432,525 | 7/1995 | Maruo et al. . |
| 5,442,788 | 8/1995 | Bier . |
| 5,467,134 | 11/1995 | Laney et al. . |
| 5,469,183 | 11/1995 | Takatsuji et al. . |
| 5,471,248 | 11/1995 | Bhargava et al. .................. 348/420 |
| 5,481,297 | 1/1996 | Cash et al. . |
| 5,491,780 | 2/1996 | Fyles et al. . |
| 5,508,713 | 4/1996 | Okouchi . |
| 5,510,839 | 4/1996 | Hamano et al. . |
| 5,557,330 | 9/1996 | Astle ................................... 348/420 |

FOREIGN PATENT DOCUMENTS

| | | |
|---|---|---|
| 2230925 | 10/1990 | United Kingdom . |
| 2299233 | 9/1996 | United Kingdom . |

OTHER PUBLICATIONS

Microsoft Foundation Class documentation for CObList; Create Compatible DC, Save DC, Restore DC Select Object, and BitBlt, in CDC; Create Compatible Bit map, GetObject, and GetBitmapBits in CBitmap, 1995.
U.K. Search Report in Application GB 9719407.0 Jan. 21, 1998.

*Primary Examiner*—Jeffery Brier
*Attorney, Agent, or Firm*—Staas & Halsey

[57] ABSTRACT

Duplicate copies of all or a portion of a display screen may be maintained at two or more computer systems with efficient use of memory, processor and bandwidth resources. The display screens are segmented into a two-dimensional matrix of blocks. A value, such as a CRC, is computed for each of the blocks and stored with a pointer to the corresponding block of the display screen. Changes in the display screen are detected by repeatedly calculating the values and comparing with previously stored values for the corresponding block. When the values are different, the pointers are temporarily stored until a predetermined period of time or all the blocks have been checked. When at least one of these criteria is met, adjacent blocks are transmitted as a group, preferably using compression.

28 Claims, 21 Drawing Sheets

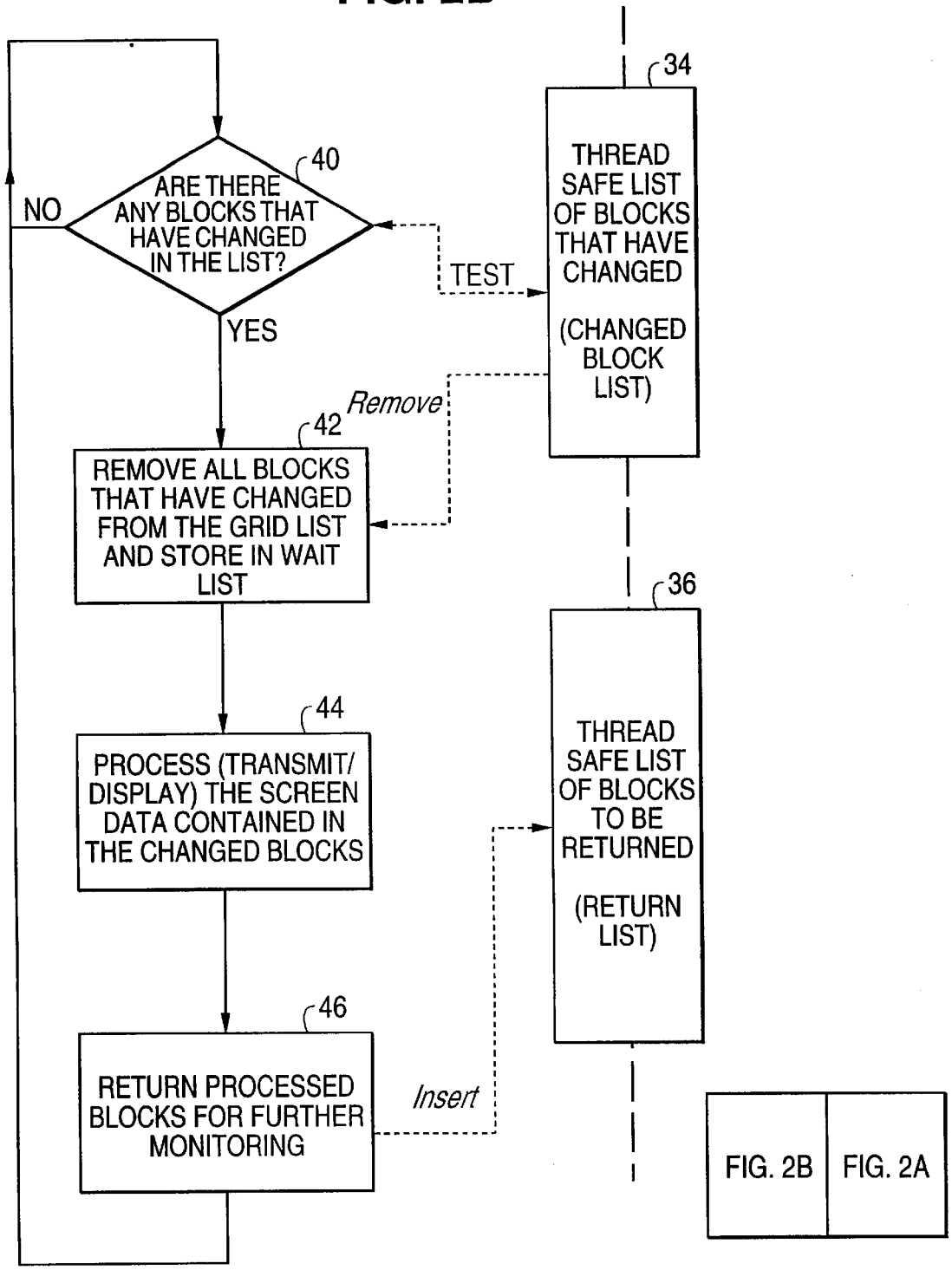

FIG. 3B

|   | A | B | C | D | E | F | G | H | I | J | K | L | M | N | O | P |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 1 | 2 | 3 | 2 | 1 | 0 | 0 | 0 | 0 | 0 | 0 | 0 | 0 | 0 |
| 4 | 0 | 0 | 0 | 1 | 2 | 3 | 2 | 1 | 0 | 0 | 0 | 0 | 0 | 0 | 0 | 0 |
| 5 | 0 | 0 | 1 | 2 | 2 | 2 | 1 | 1 | 0 | 0 | 0 | 0 | 0 | 0 | 0 | 0 |
| 6 | 0 | 0 | 1 | 1 | 2 | 2 | 2 | 1 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 1 | 2 | 3 | 2 | 1 | 0 | 0 | 0 |
| 12 | 0 | 0 | 0 | 0 | 0 | 0 | 0 | 0 | 1 | 2 | 2 | 1 | 0 | 0 | 0 | 0 |
| 13 | 0 | 0 | 0 | 0 | 0 | 0 | 0 | 0 | 1 | 2 | 2 | 2 | 1 | 1 | 0 | 0 |
| 14 | 0 | 0 | 0 | 0 | 0 | 0 | 0 | 0 | 0 | 1 | 2 | 2 | 1 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 3C

|   | A | B | C | D | E | F | G | H | I | J | K | L | M | N | O | P |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 0 | 0 | 0 | 1 | 1 | 1 | 0 | 0 | 0 | 0 | 0 | 0 | 0 | 0 | 0 | 0 |
| 3 | 0 | 0 | 1 | 3 | 5 | 4 | 2 | 0 | 0 | 0 | 0 | 0 | 0 | 0 | 0 | 0 |
| 4 | 0 | 0 | 0 | 3 | 5 | 5 | 4 | 1 | 0 | 0 | 0 | 0 | 0 | 0 | 0 | 0 |
| 5 | 0 | 0 | 1 | 4 | 4 | 4 | 4 | 1 | 0 | 0 | 0 | 0 | 0 | 0 | 0 | 0 |
| 6 | 0 | 0 | 1 | 3 | 3 | 3 | 4 | 1 | 0 | 0 | 0 | 0 | 0 | 0 | 0 | 0 |
| 7 | 0 | 0 | 0 | 1 | 0 | 1 | 1 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 3D

|   | A | B | C | D | E | F | G | H | I | J | K | L | M | N | O | P |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 0 | 0 | 0 | 1 | 1 | 1 | 0 | 0 | 0 | 0 | 0 | 0 | 0 | 0 | 0 | 0 |
| 3 | 0 | 0 | 1 | 3 | 5 | 4 | 2 | 0 | 0 | 0 | 0 | 0 | 0 | 0 | 0 | 0 |
| 4 | 0 | 0 | 0 | 3 | 5 | 5 | 4 | 1 | 0 | 0 | 0 | 0 | 0 | 0 | 0 | 0 |
| 5 | 0 | 0 | 1 | 4 | 4 | 4 | 4 | 1 | 0 | 0 | 0 | 0 | 0 | 0 | 0 | 0 |
| 6 | 0 | 0 | 1 | 3 | 3 | 3 | 4 | 1 | 0 | 0 | 0 | 0 | 0 | 0 | 0 | 0 |
| 7 | 0 | 0 | 0 | 1 | 0 | 1 | 1 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 3E

|   | A | B | C | D | E | F | G | H | I | J | K | L | M | N | O | P |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 0 | 0 | 0 | 1 | 1 | 1 | 0 | 0 | 0 | 0 | 0 | 0 | 0 | 0 | 0 | 0 |
| 3 | 0 | 0 | 1 | 3 | 5 | 4 | 2 | 0 | 0 | 0 | 0 | 0 | 0 | 0 | 0 | 0 |
| 4 | 0 | 0 | 0 | 3 | 5 | 5 | 4 | 1 | 0 | 0 | 0 | 0 | 0 | 0 | 0 | 0 |
| 5 | 0 | 0 | 1 | 4 | 4 | 4 | 4 | 1 | 0 | 0 | 0 | 0 | 0 | 0 | 0 | 0 |
| 6 | 0 | 0 | 1 | 3 | 3 | 3 | 4 | 1 | 0 | 0 | 0 | 0 | 0 | 0 | 0 | 0 |
| 7 | 0 | 0 | 0 | 1 | 0 | 1 | 1 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 4A

|    | A | B | C | D | E | F | G | H | I | J | K | L | M | N | O | P |
|----|---|---|---|---|---|---|---|---|---|---|---|---|---|---|---|---|
| 1  | 0 | 0 | 0 | 0 | 0 | 0 | 0 | 0 | 0 | 0 | 0 | 0 | 0 | 0 | 0 | 0 |
| 2  | 0 | 0 | 0 | 1 | 1 | 1 | 0 | 0 | 0 | 0 | 0 | 0 | 0 | 0 | 0 | 0 |
| 3  | 0 | 0 | 1 | 3 | 5 | 4 | 2 | 0 | 0 | 0 | 0 | 0 | 0 | 0 | 0 | 0 |
| 4  | 0 | 0 | 0 | 3 | 5 | 5 | 4 | 1 | 0 | 0 | 0 | 0 | 0 | 0 | 0 | 0 |
| 5  | 0 | 0 | 1 | 4 | 4 | 4 | 4 | 1 | 0 | 0 | 0 | 0 | 0 | 0 | 0 | 0 |
| 6  | 0 | 0 | 1 | 3 | 3 | 3 | 4 | 1 | 0 | 0 | 0 | 0 | 0 | 0 | 0 | 0 |
| 7  | 0 | 0 | 0 | 1 | 0 | 1 | 1 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 4B

|   | A | B | C | D | E | F | G | H | I | J | K | L | M | N | O | P |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 0 | 0 | 0 | 1 | 1 | 1 | 0 | 0 | 0 | 0 | 0 | 0 | 0 | 0 | 0 | 0 |
| 3 | 0 | 0 | 1 | 3 | 5 | 4 | 2 | 0 | 0 | 0 | 0 | 0 | 0 | 0 | 0 | 0 |
| 4 | 0 | 0 | 0 | 3 | 5 | 5 | 4 | 1 | 0 | 0 | 0 | 0 | 0 | 0 | 0 | 0 |
| 5 | 0 | 0 | 1 | 4 | 4 | 4 | 4 | 1 | 0 | 0 | 0 | 0 | 0 | 0 | 0 | 0 |
| 6 | 0 | 0 | 1 | 3 | 3 | 3 | 4 | 1 | 0 | 0 | 0 | 0 | 0 | 0 | 0 | 0 |
| 7 | 0 | 0 | 0 | 1 | 0 | 1 | 1 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 5A

|    | A | B | C | D | E | F | G | H | I | J | K | L | M | N | O | P |
|----|---|---|---|---|---|---|---|---|---|---|---|---|---|---|---|---|
| 1  | 0 | 0 | 0 | 0 | 0 | 0 | 0 | 0 | 0 | 0 | 0 | 0 | 0 | 0 | 0 | 0 |
| 2  | 0 | 0 | 0 | 1 | 1 | 1 | 0 | 0 | 0 | 0 | 0 | 0 | 0 | 0 | 0 | 0 |
| 3  | 0 | 0 | 1 | 3 | 5 | 4 | 2 | 0 | 0 | 0 | 0 | 0 | 0 | 0 | 0 | 0 |
| 4  | 0 | 0 | 0 | 3 | 5 | 5 | 4 | 1 | 0 | 0 | 0 | 0 | 0 | 0 | 0 | 0 |
| 5  | 0 | 0 | 1 | 4 | 4 | 4 | 4 | 1 | 0 | 0 | 0 | 0 | 0 | 0 | 0 | 0 |
| 6  | 0 | 0 | 1 | 3 | 3 | 3 | 4 | 1 | 0 | 0 | 0 | 0 | 0 | 0 | 0 | 0 |
| 7  | 0 | 0 | 0 | 1 | 0 | 1 | 1 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 5B

|   | A | B | C | D | E | F | G | H | I | J | K | L | M | N | O | P |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 0 | 0 | 0 | 1 | 1 | 1 | 0 | 0 | 0 | 0 | 0 | 0 | 0 | 0 | 0 | 0 |
| 3 | 0 | 0 | 1 | 3 | 5 | 4 | 2 | 0 | 0 | 0 | 0 | 0 | 0 | 0 | 0 | 0 |
| 4 | 0 | 0 | 0 | 3 | 5 | 5 | 4 | 1 | 0 | 0 | 0 | 0 | 0 | 0 | 0 | 0 |
| 5 | 0 | 0 | 1 | 4 | 4 | 4 | 4 | 1 | 0 | 0 | 0 | 0 | 0 | 0 | 0 | 0 |
| 6 | 0 | 0 | 1 | 3 | 3 | 3 | 4 | 1 | 0 | 0 | 0 | 0 | 0 | 0 | 0 | 0 |
| 7 | 0 | 0 | 0 | 1 | 0 | 1 | 1 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 5C

|    | A | B | C | D | E | F | G | H | I | J | K | L | M | N | O | P |
|----|---|---|---|---|---|---|---|---|---|---|---|---|---|---|---|---|
| 1  | 0 | 0 | 0 | 0 | 0 | 0 | 0 | 0 | 0 | 0 | 0 | 0 | 0 | 0 | 0 | 0 |
| 2  | 0 | 0 | 0 | 1 | 1 | 1 | 0 | 0 | 0 | 0 | 0 | 0 | 0 | 0 | 0 | 0 |
| 3  | 0 | 0 | 1 | 3 | 5 | 4 | 2 | 0 | 0 | 0 | 0 | 0 | 0 | 0 | 0 | 0 |
| 4  | 0 | 0 | 0 | 3 | 5 | 5 | 4 | 1 | 0 | 0 | 0 | 0 | 0 | 0 | 0 | 0 |
| 5  | 0 | 0 | 1 | 4 | 4 | 4 | 4 | 1 | 0 | 0 | 0 | 0 | 0 | 0 | 0 | 0 |
| 6  | 0 | 0 | 1 | 3 | 3 | 3 | 4 | 1 | 0 | 0 | 0 | 0 | 0 | 0 | 0 | 0 |
| 7  | 0 | 0 | 0 | 1 | 0 | 1 | 1 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 1 | 1 | 0 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 6A

|    | A | B | C | D | E | F | G | H | I | J | K | L | M | N | O | P |
|----|---|---|---|---|---|---|---|---|---|---|---|---|---|---|---|---|
| 1  | 0 | 0 | 0 | 0 | 0 | 0 | 0 | 0 | 0 | 0 | 0 | 0 | 0 | 0 | 0 | 0 |
| 2  | 0 | 0 | 0 | 1 | 1 | 1 | 0 | 0 | 0 | 0 | 0 | 0 | 0 | 0 | 0 | 0 |
| 3  | 0 | 0 | 1 | 3 | 5 | 4 | 2 | 0 | 0 | 0 | 0 | 0 | 0 | 0 | 0 | 0 |
| 4  | 0 | 0 | 0 | 3 | 5 | 5 | 4 | 1 | 0 | 0 | 0 | 0 | 0 | 0 | 0 | 0 |
| 5  | 0 | 0 | 1 | 4 | 4 | 4 | 4 | 1 | 0 | 0 | 0 | 0 | 0 | 0 | 0 | 0 |
| 6  | 0 | 0 | 1 | 3 | 3 | 3 | 4 | 1 | 0 | 0 | 0 | 0 | 0 | 0 | 0 | 0 |
| 7  | 0 | 0 | 0 | 1 | 0 | 1 | 1 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 5 | 4 | 1 | 0 | 0 | 0 |
| 12 | 0 | 0 | 0 | 0 | 0 | 0 | 0 | 0 | 0 | 3 | 5 | 4 | 2 | 0 | 0 | 0 |
| 13 | 0 | 0 | 0 | 0 | 0 | 0 | 0 | 0 | 1 | 3 | 4 | 4 | 3 | 1 | 0 | 0 |
| 14 | 0 | 0 | 0 | 0 | 0 | 0 | 0 | 0 | 0 | 1 | 2 | 3 | 4 | 1 | 0 | 0 |
| 15 | 0 | 0 | 0 | 0 | 0 | 0 | 0 | 0 | 0 | 0 | 0 | 1 | 1 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 6B

|    | A | B | C | D | E | F | G | H | I | J | K | L | M | N | O | P |
|----|---|---|---|---|---|---|---|---|---|---|---|---|---|---|---|---|
| 1  | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 |
| 3  | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 0 | 0 | 0 | 0 |
| 5  | 0 | 0 | 0 | 0 | 0 | 0 | 0 | 0 | 0 | 0 | 0 | 0 | 0 | 0 | 0 | 0 |
| 6  | 0 | 0 | 0 | 0 | 0 | 0 | 0 | 0 | 0 | 0 | 0 | 0 | 0 | 0 | 0 | 0 |
| 7  | 0 | 0 | 0 | 0 | 0 | 0 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 1 | 1 | 1 | 0 | 0 | 0 | 0 |
| 11 | 0 | 0 | 0 | 0 | 0 | 0 | 0 | 0 | 1 | 3 | 4 | 3 | 1 | 0 | 0 | 0 |
| 12 | 0 | 0 | 0 | 0 | 0 | 0 | 0 | 0 | 1 | 1 | 1 | 1 | 0 | 0 | 0 | 0 |
| 13 | 0 | 0 | 0 | 0 | 0 | 0 | 0 | 0 | 1 | 2 | 1 | 0 | 0 | 0 | 0 | 0 |
| 14 | 0 | 0 | 0 | 0 | 0 | 0 | 0 | 0 | 0 | 1 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 |

FIG. 6C

DISPLAY SCREEN DUPLICATION SYSTEM AND METHOD

BACKGROUND OF THE INVENTION

1. Field of the Invention

The present invention is directed to maintaining duplicate copies of at least a portion of a computer display screen at two or more physically remote locations and, more particularly, to efficiently communicating changes in one display screen to one or more other display screens.

2. Description of the Related Art

There are a number of applications which produce copies of all or a portion of a computer display screen on more than one data processing system. Examples include remote access software, application sharing and various types of teleconferencing. The simplest way to produce copies of a display screen on two computer systems is to send the entire contents of the screen on a periodic basis. This requires transmitting large amounts of data. For example, approximately 800 kilobytes are used to define a 1024×768 display screen having 256 colors. As video resolution and color depth continue to increase, the amount of data that must be transferred becomes prohibitive, especially when using a low bandwidth connection, such as a modem. Although compression can be used to reduce the amount of data that is sent, compression may require significant processor (CPU) resources and it is preferable to reduce the amount of data prior to compression.

Another alternative is to send the same instructions used to generate the display screen to the computer systems displaying a copy of the display screen. This requires that essentially the same software is being executed on all of the computer systems and that the appropriate screen commands can be intercepted or routed to the appropriate systems. Another technique is disclosed in U.S. Pat. Nos. 5,241,625 and 5,491,780 which depend upon "hooks" into the operating system software. Some operating systems, such as Windows NT, provide a secure operating system environment in which it is difficult to intercept commands that affect the display screen and therefore, the initial program generating the display must be capable of routing the display screen commands to remote location(s).

One way to decrease the amount of data that must be sent without intercepting system commands is to only send differences from the previous screen that was sent. Often, only a small area of the screen is changed and there is no need to send the entire contents of the screen each time, thereby significantly reducing the bandwidth required to update the remote display screen quickly. Assuming that two computer systems are using this technique to maintain copies of a window on local and remote display screens, the local system will transfer a copy of the entire screen to the remote system and store a copy as a reference image. Periodically, the local system will read the local display screen and perform a logical exclusive OR (XOR) with the reference image and store the result of this operation in what will be called a delta buffer. The delta buffer contains only the differences between the reference image and the current screen contents. The delta buffer is then compressed and transmitted to the remote system which decompresses the transmitted data and updates the remote display screen. Both the local and remote systems save the updated screen contents as a new reference image and the procedure is repeated.

The delta buffer technique has the distinct advantage of greatly reducing the amount of data that must be transmitted. This significantly improves the performance in limited bandwidth environments which is highly desirable today when screen data is often very dense compared to available bandwidth. However, the delta buffer technique has a drawback in the amount of memory required. Three blocks of memory the size of the video memory are required, one for the reference image, another for the current screen contents and another for the result of the logical XOR.

SUMMARY OF THE INVENTION

An object of the present invention is to provide a screen transfer method that is efficient in use of CPU resources, memory and bandwidth.

Another object of the present invention is to provide a screen transfer method that can be used with secure operating systems.

A further object of the present invention is to provide an efficient screen transfer method that produces data which can be efficiently compressed despite the small amount of data transferred.

Yet another object of the present invention is to provide an efficient screen transfer method compatible with data caching for faster display when pop-up windows disappear.

The above objects are attained by providing a method of transmitting display data from a first display to a second display by segmenting the first display into blocks; calculating and storing first values, each representing contents of one of the blocks; calculating second values, each representing the contents of one of the blocks, after the first values are calculated; and transmitting changed blocks from the first display to the second display when the first and second values for the changed blocks are unequal.

If the present invention is used in a computer system controlled by a multi-threaded operating system, preferably a first thread or monitoring thread stores a cyclic redundancy code (CRC) as the computed values in a grid list with a block identifier for each of the blocks into which the first display is segmented. When comparison of the first and second values determines that the CRC for one of the blocks has changed, the block identifier of the changed block is inserted into a wait list. The wait list is maintained in the order in which the changed blocks are detected until all of the blocks have been checked for changes after the first changed block is detected, or after a predetermined period of time, such as one-quarter or one-half second has elapsed.

In a multi-threaded environment, the contents of the wait list are preferably moved all at once by the monitoring thread to a changed block list for access by a second, or main thread which performs several functions, including grouping blocks to be transmitted from a first computer system which includes the first display to a second computer system which includes the second display. Like the wait list, the changed block list is also maintained in the order in which changed blocks are detected. The main thread reads the first block identifier in the changed block list which corresponds to the least recently changed block, finds a rectangle containing mostly changed blocks adjacent to the least recently changed block and transmits data corresponding to the changed blocks to the second computer system, so that the changed blocks can be displayed on the second display. The data sent to the second display which corresponds to the changed blocks may be obtained by reading the video memory, performing any conventional data compression desired and transmitting the data with the block identifiers of the blocks in the rectangle. The CRC may also be transmitted as part of the data corresponding to the changed blocks, so that the first and second computer systems can use the CRC and block identifier in a caching system of the blocks which are currently or recently displayed on the first and second displays.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIGS. 3A–6C are illustrations of a display screen segmented into a sixteen by sixteen (16×16) array of cells or blocks as changes are made, detected and transmitted to a remote system.

DESCRIPTION OF THE PREFERRED EMBODIMENTS

Figure 1:
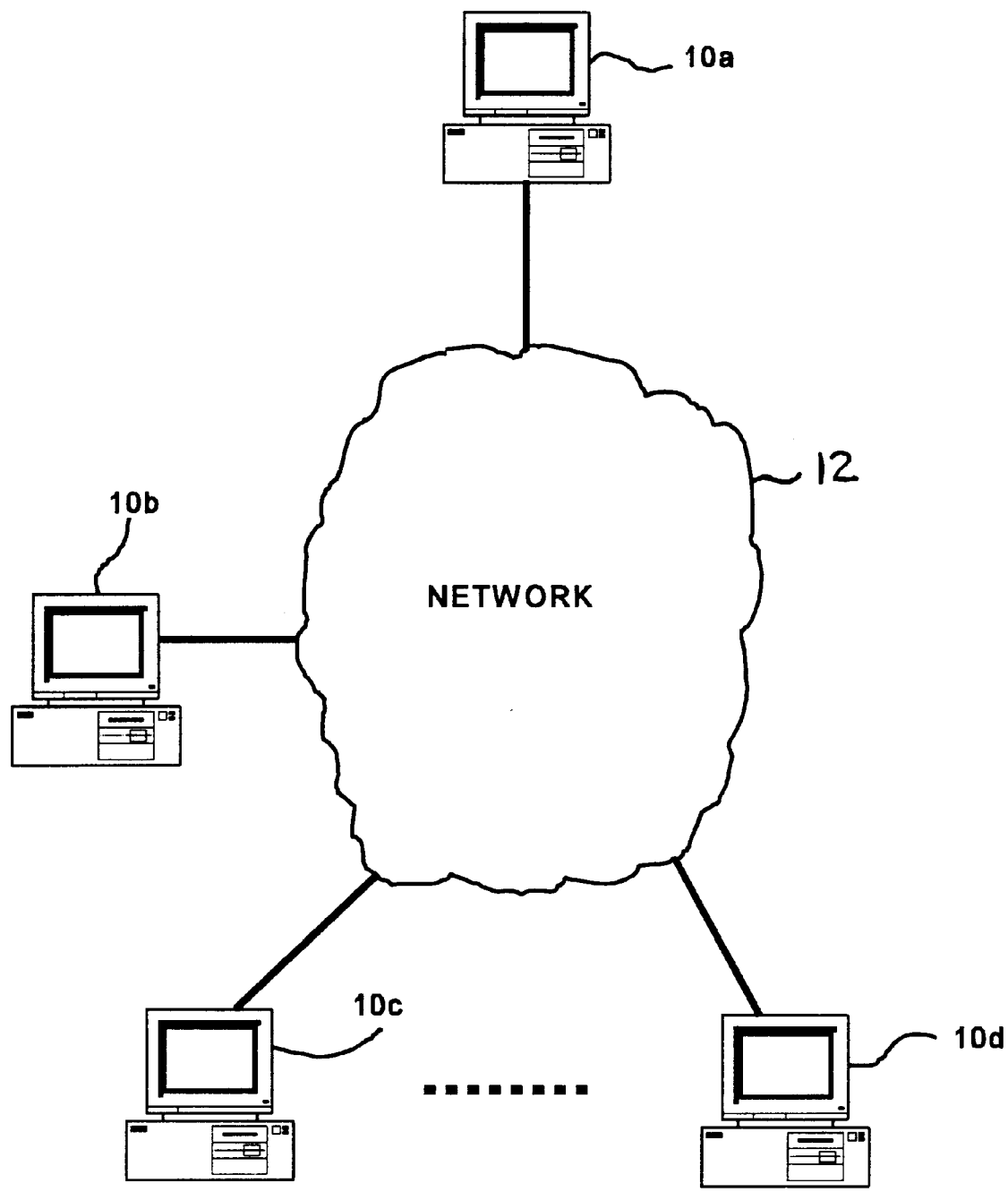
FIG. 1 is a block diagram of a networked computer system.

A block diagram of networked computer systems 10a–d connected by a network 12 is illustrated in FIG. 1. Network 12 may have any conventional structure, including any topology of local area network, a wide area network, or a public network like the Internet. Since any type of network 12 can be used, the term transmission line will also be used to refer to the connection from one computer system, such as 10a, to one or more other computer systems, e.g., 10b. As illustrated in FIG. 1, includes a display for displaying text or graphics in any conventional manner.

Figure 2A:
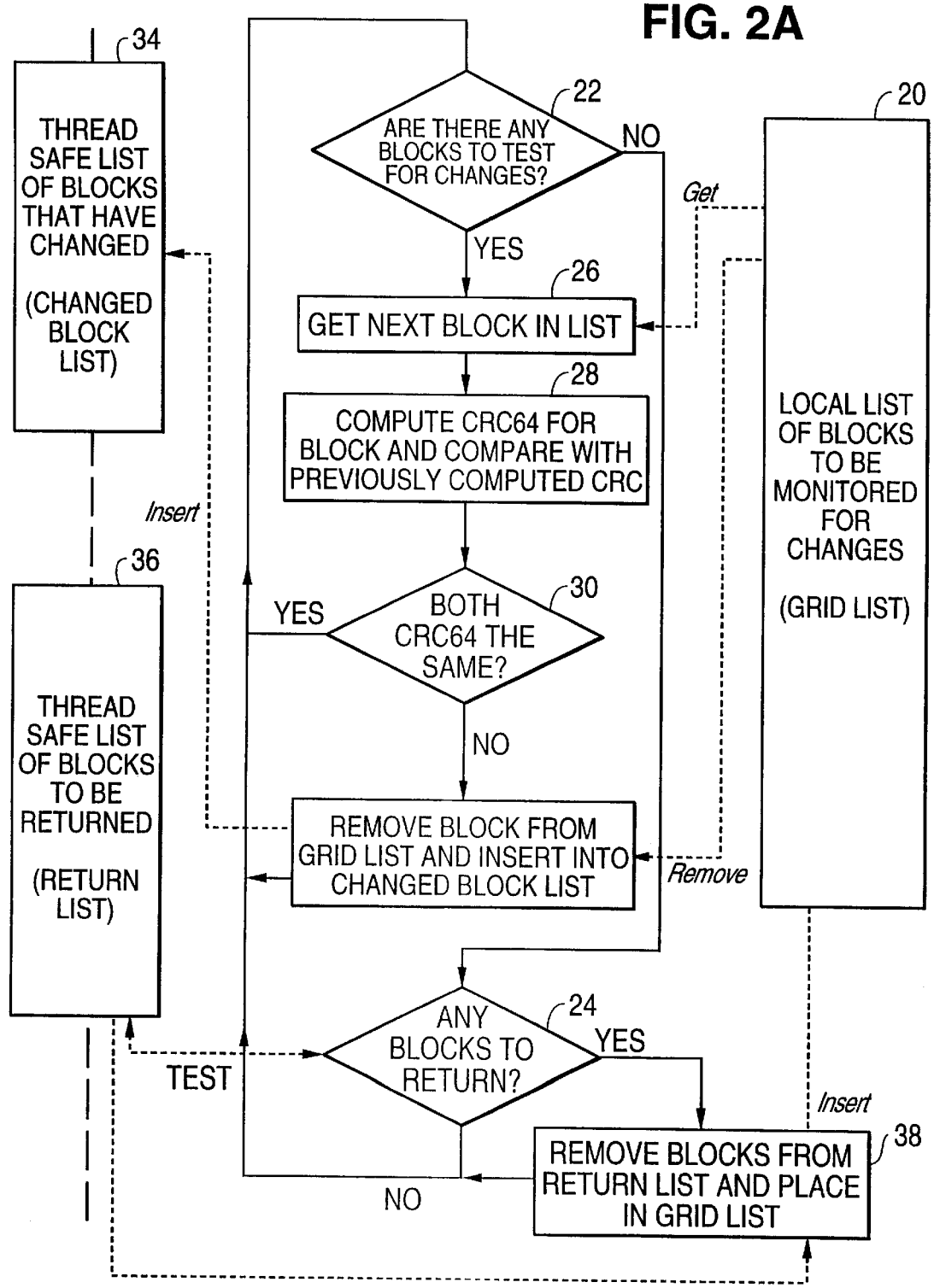
FIG. 2 is a flowchart of a method according to the present invention.

In the disclosed embodiment, the present invention operates in a multi-threaded operating system environment. FIGS. 2A and 2B illustrate the procedures performed by two simultaneously executing threads. A first or monitoring thread is illustrated in FIG. 2A and a second or main thread is illustrated in FIG. 2B. When the operating system is incapable of multi-threaded operation, or it is desired to use only a single thread for a process according to the present invention, timers and counters can be used to execute a portion of the procedure and then switch to the other portion of the procedure in a manner described below for a multi-threaded operating system.

The monitoring thread illustrated in FIG. 2 monitors changes in the display screen and passes pointers to changed blocks to the main thread illustrated in FIG. 2B. The changed blocks can be determined by reading the video memory, or using any other known technique. In the exemplary source code, the BitBlt() function is used to copy the contents of the screen into the buffer. Depending on the operating system and the drivers being used, the BitBlt call will either: (1) read the contents of the video memory and place it into a buffer using a documented format; (2) place the contents of the screen into a buffer without accessing video memory directly (this would occur if the operating system or driver maintained knowledge of the screen contents that could be used without accessing screen memory; or (3) use any other method to place the contents of the screen (or screen section) into a buffer using a documented data format.

Figure 3A:
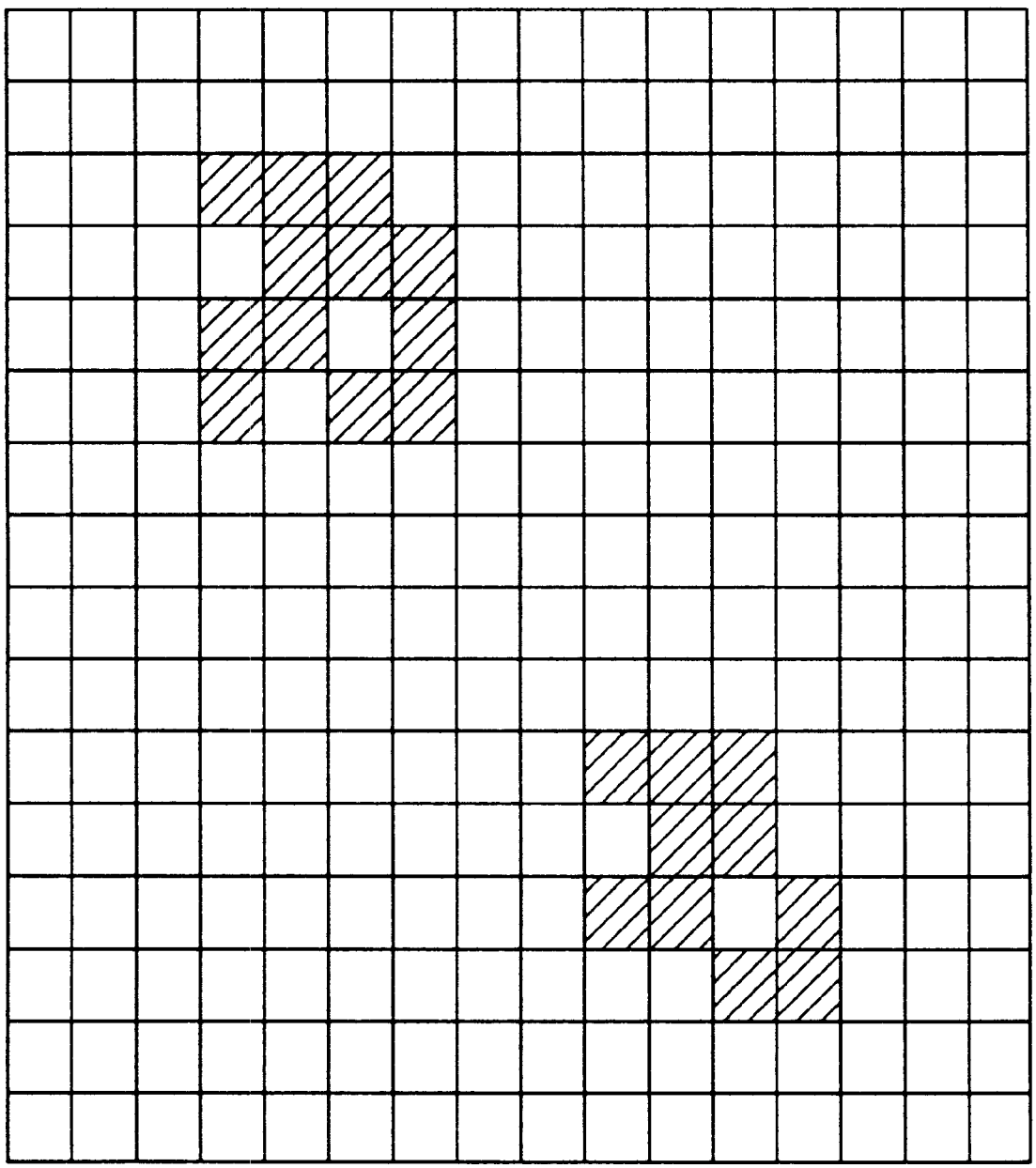

An example of a segmented screen is provided in FIG. 3A with changed blocks indicated by hatching. Although the drawings in FIGS. 3A–6C show a display screen segmented into an array of 16×16 blocks, other numbers of blocks may be used. Preferably the number of blocks in both directions are multiples of two; however, the number of blocks in one direction may be different from the number of blocks in the other direction, since most display screens are not square. The number of blocks used will depend upon screen resolution, processing power and memory and bandwidth availability. For example, there may be 32 blocks horizontally and 24 blocks vertically for a 1024×768 pixel display screen.

Identifiers of the blocks and pointers to the blocks are stored in a data structure which will be referred to as a grid list 20 (FIG. 2A). In the exemplary C++ code in the microfiche appendix, a linked list is used for the grid list and the other lists described below. However, the term "list" as used herein is not limited to a linked list; any data structure capable of storing the information can be used.

In FIGS. 2A and 2B, the solid lines indicate program flow and the short dash lines indicate data flow. The long dash line running along the left side of FIG. 2A and right side of FIG. 2B indicates where FIGS. 2A and 2B join.

The monitoring thread illustrated in FIG. 2A checks in step 22 to see if there are any blocks in the grid list 20 and if not checks in step 24 to see if there are any blocks being returned. In the exemplary source code, initially, the grid list 20 is filled with block identifiers (pGrid in the exemplary source code) and two 32-bit CRCs are calculated in different ways to effectively form a CRC64. This provides a one in $2^{64}$ (18 billion·billion) chance of there being duplicate values calculated for different blocks. If a lower possibility of duplication is acceptable, other calculations may be used to derive values to be stored in the grid list, such as CRC32, check sums, etc. If no changes have previously been detected, processing will continue after the check in step 22 to get in step 26 the next block in the list and compute 28 a CRC64 for the data currently displayed on the screen.

The first value stored in the grid list 20 and the second value computed in step 28 are compared in step 30. If they are same, processing continues with step 22. If the first and second values of the block being monitored are different, the data stored in the grid list 20 corresponding to that block is removed in step 32 from the grid list and inserted into a list of blocks that have changed. In the preferred embodiment as indicated in the microfiche appendix, the data for the changed blocks is first stored in a wait list until predetermined criteria have been met, at which time the data is moved to a thread safe list 34 of blocks that have changed, i.e., the changed block list (DirtyList in the exemplary source code). In the preferred embodiment, the predetermined criteria are one-quarter second after the first changed block is inserted into an empty wait list or after all of the blocks, starting with the first changed block stored in the wait list, have been checked in step 30.

After blocks have been transmitted as described below with respect to FIG. 2B, the data identifying the changed blocks is stored by the main thread in a thread safe list 36, i.e., the return list. When it is determined in step 22 that the grid list has been checked an appropriate amount, e.g., when the wait list is emptied, the monitoring thread checks 24 to see if there are any blocks identified in the return list 36 and if so, the blocks are removed in step 38 from the return list and returned to the grid list 20.

As illustrated in FIG. 2B, the main thread repeatedly checks 40 for any blocks that have changed in the changed block list 34. When a block is located, the data identifying all the blocks that have changed are removed from the changed block list 34 and stored locally for processing in step 44 to transmit the information contained in the changed blocks to one or more remote displays. The data identifying the processed blocks are stored in the return list 36 for further monitoring after they are removed 38 from the return list, as described above.

Figure 7A:
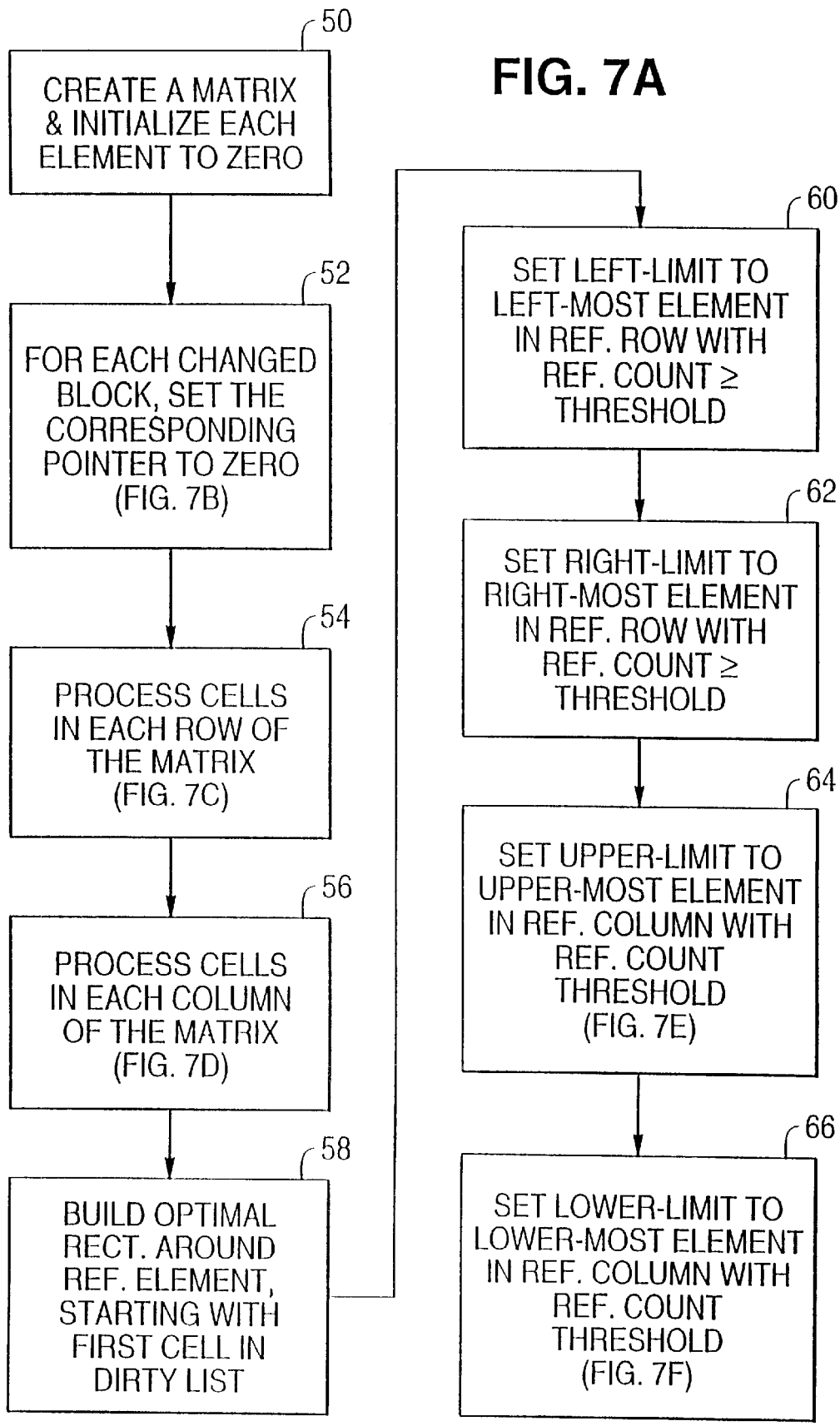
FIGS. 7A–7F are detailed flowcharts of a method according to the present invention.
Figure 7B:
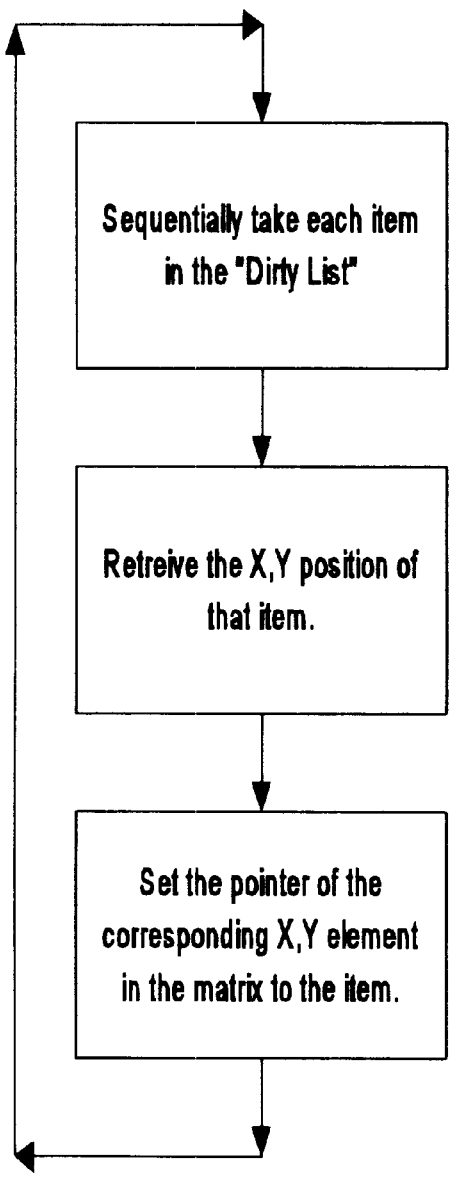
Figure 7C:
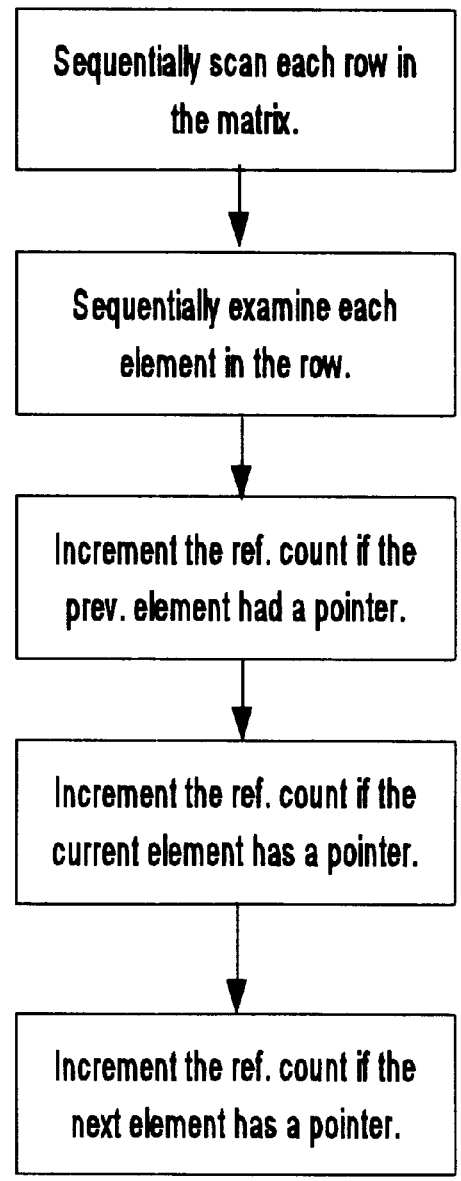
Figure 7D:
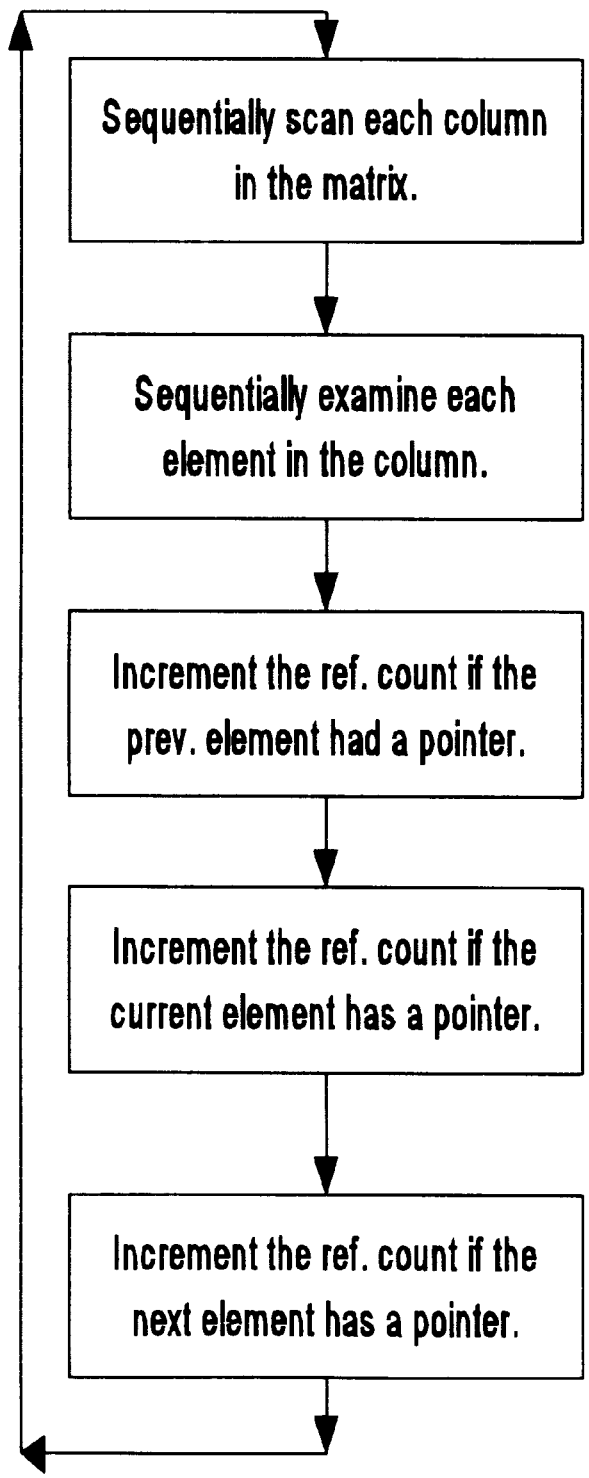

The process of finding an optimal rectangle performed in step 44 of the flowchart illustrated in FIG. 2B is illustrated in FIG. 7A. A matrix having one cell corresponding to each of the blocks of the segmented display screen, e.g., a 16×16 array like that illustrated in FIG. 3A, is created with a reference count and a pointer or reference to the block of screen data. The pointer of each element of the matrix is set 52 to point to the corresponding block of screen data if the block has changed, or to NULL if the block has not changed, by performing the steps illustrated in FIG. 7B. Next, the cells in each row of the matrix are processed in step 54 by performing the steps illustrated in FIG. 7C; then, each of the columns is processed in step 56 by performing the steps illustrated in FIG. 7D. The results of steps 54 and 56 is a matrix like that illustrated in FIG. 3B for the example described below with respect to FIGS. 3A–6C.

Figure 7E:
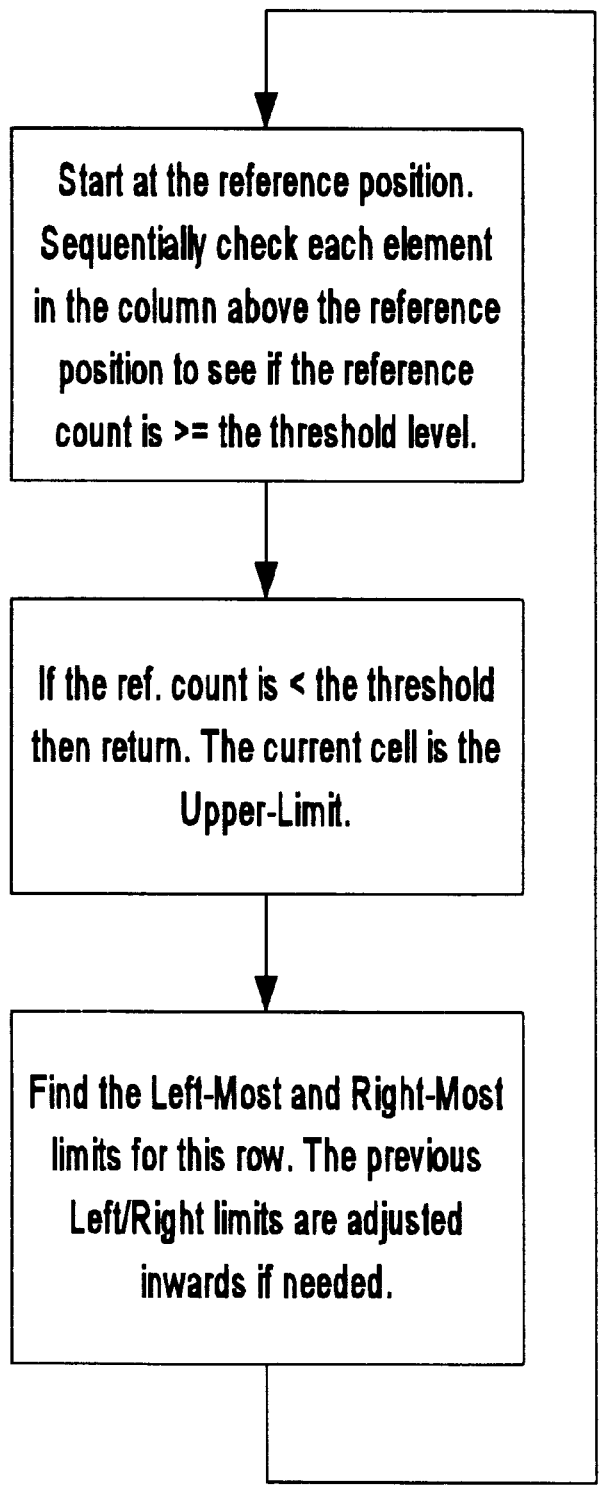
Figure 7F:
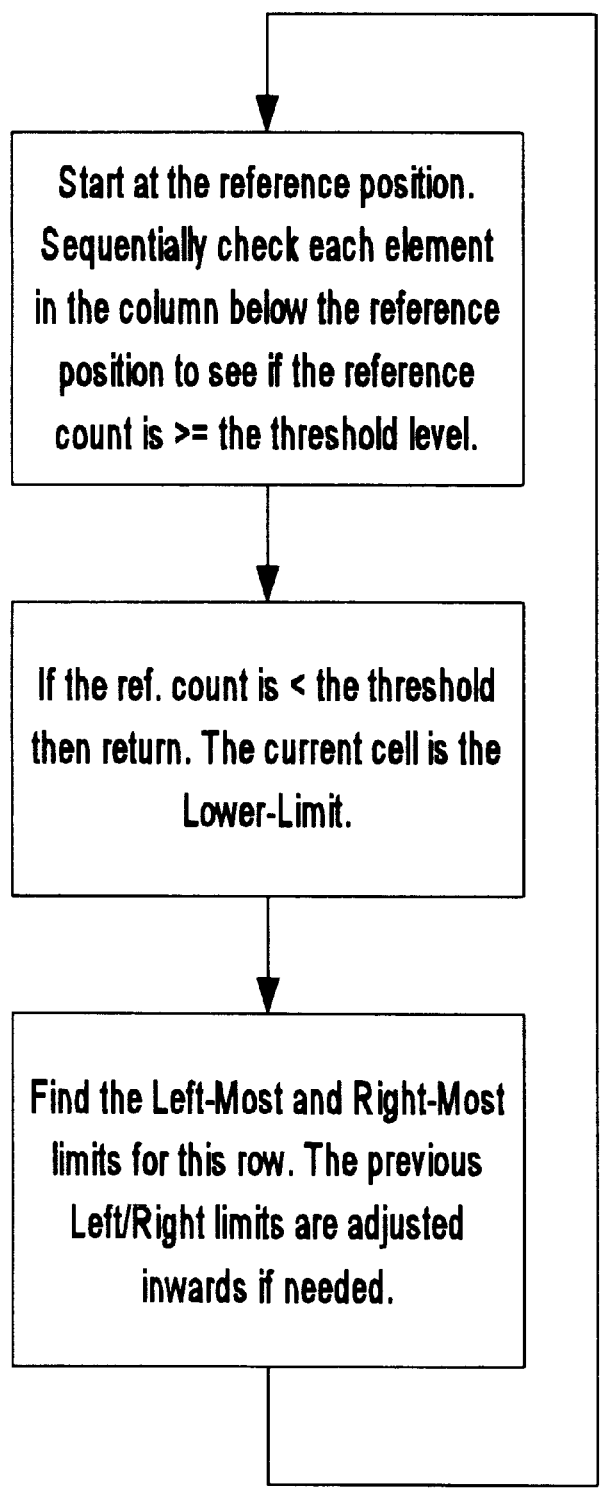

The matrix resulting from step 56 is processed starting 58 with the least recently changed block which corresponds to data at the head of the changed block list (DirtyList in the exemplary code). Starting with the reference row containing the reference element, the left-most and right-most elements are found in steps 60 and 62, respectively, which are greater than or equal to a threshold level. In the example illustrated in FIGS. 3A–6C, the threshold level is 2. This procedure is repeated as illustrated in FIG. 7E to find 64 the upper limit. The left-limit and right-limit are adjusted if the element directly above the reference element is greater than or equal to the threshold level, but a lower valued element is located before reaching the previous left-limit or right-limit when scanning across the row. Similarly, the lower-limit is found 66 and the left- and right-limits are adjusted as illustrated in FIG. 7F.

Figure 3B:
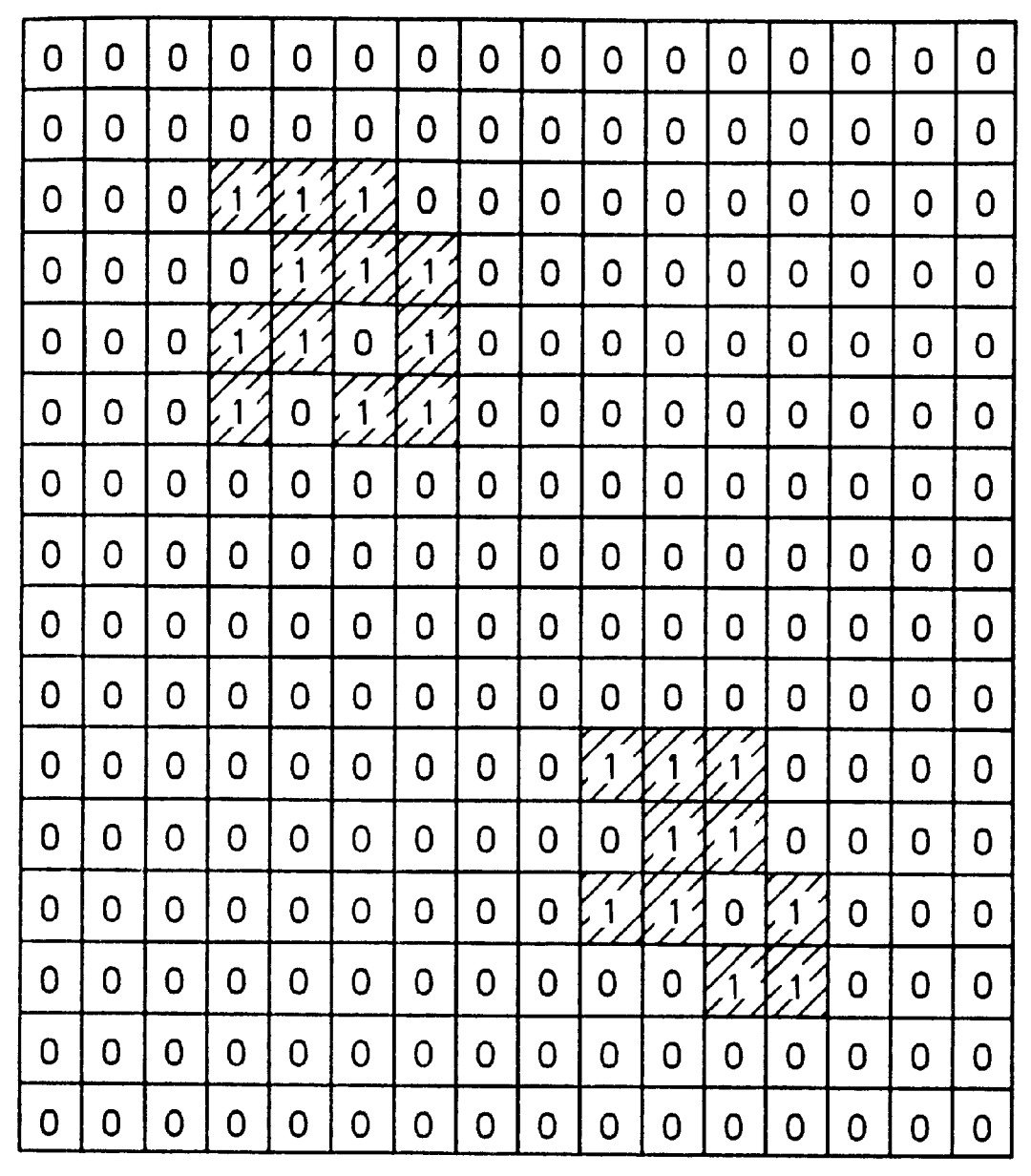

An example of locating optimum rectangle(s) for a set of changed blocks will now be described with reference to FIGS. 3A–6C. FIG. 3A is an illustration of a screen segmented into a sixteen by sixteen (16×16) array of cells or blocks in which 12 blocks have been changed in the upper left quadrant and ten blocks have been changed in the lower right quadrant, as indicated by hatching. As described above, changes in a segment or block of the screen are indicated by setting a counter associated with the block. All of the blocks without any changes have their counter set to 0. If the blocks with changes have their associated counter set to 1, the resulting matrix would appear as illustrated in FIG. 3B, where the shading used in FIG. 3A is also shown.

In the conventional method of transmitting only those segments having changes (using the delta buffer described above), the shaded blocks having a counter value of 1 would be sent, one block at a time. However, due to greater efficiencies obtained by run length, or intraframe encoding techniques, it is preferable to send larger groups of data if most of the blocks in the group have changed, even if a few of the blocks have not changed. Therefore, the present invention obtains an optimal rectangle after using the method described above to assign values to the associated counters.

According to the present invention, the associated counter values are incremented if the block or an adjacent block has changed. The array is first scanned horizontally in step 54 to produce the counter values illustrated in FIG. 3C. To aid in describing FIGS. 3C–6C, columns have been identified by letters and the rows identified by numbers, but neither are used either on the screen or in the arrays. As illustrated in FIG. 3C, at the end of step 54, unchanged blocks to the left or right of a changed block have a value of 1, while unchanged blocks having changed blocks on both sides have a value of 2, as do all changed blocks having only one adjacent changed block. Changed blocks with no horizontally adjacent changed blocks have a value of 1, while changed blocks with 2 horizontally adjacent changed blocks have a value of 3. In step 56, the array is scanned vertically and the same incrementing rule is applied to produce the counter values illustrated in FIG. 3D.

Using the counter values illustrated in FIG. 3D, an area of mostly changed blocks can be defined by setting a threshold level of 2 for blocks to be included. Using this threshold level, it is immediately apparent that the entire square indicated by double lines in the upper left hand corner of FIG. 3B will be sent together in a single operation. Such a group of blocks will be referred to as an "optimal rectangle."

As noted above, the group of changed blocks in the lower right-hand corner of FIGS. 3A–3B (and FIGS. 5A–6C which are discussed below) differs from the group in the upper left-hand corner only in that the lower left-hand block of the upper group, i.e., block D6, includes a change, but the corresponding block in the lower group, i.e., block J14, does not. Similarly, block G4 in the upper group has been changed, but the corresponding block M12 in the lower group has not. As a result, the lower left-hand and upper right-hand blocks of the lower group, i.e., blocks J14 and M11, have a counter value lower than the threshold. An algorithm could be written which would include 16 blocks of the lower group, just as 16 blocks of the upper group formed an optimal rectangle. However, a larger number of unchanged blocks would be included. Therefore, in the preferred embodiment the method described above is used to select the optimal rectangle.

In the preferred embodiment, each block within an optimal rectangle must have a counter value greater than or equal to the threshold level, which in this example is 2. As described above, the changed block list (identified as the DirtyList in the exemplary code) is maintained in order starting with the first detected changed block (least recently changed block) that has not been transmitted. Depending upon which of the changed blocks in the lower group was detected first, different optimal rectangles will be selected.

In the preferred embodiment, processing starts with the block at the head of the changed block list (DirtyList). This has been referred to as the reference element in a reference row and reference column. The left-most and right-most changed blocks in the reference row are located by scanning first to the left and then to the right until blocks having a counter value below the threshold level is located. This procedure is repeated on each row above and below the starting point until blocks in the reference column above and below the reference element are found which have a counter value below the threshold level. The closest blocks to the left and right of the starting column which have a counter below the threshold level define the left and right limits of the optimal rectangle.

Thus, if the first reference element of the lower group is any of the cross-hatched areas outlined by the double line in FIG. 4A, i.e., block J11 or block J13, the blocks outlined by the double line will be included in the first optimal rectangle for the lower group. As shown in FIG. 4A, blocks J10 and J14 are below the threshold and therefore, the upper limit of the optimal rectangle will be row 11 and the lower limit will be row 13. Row 11 has blocks with counters below the threshold level which are closest to the reference column, column J. Therefore, the final left-most column is column J and the final right-most column is column K and the rectangle outlined by a double line in FIG. 4A will be transmitted. To complete transmission of the lower group when either of blocks J11 and J13 are at the head of the changed block list, a rectangle formed of blocks L13, L14, M13 and M14 (indicated by the double line outline in FIG. 4B) will be transmitted, assuming that no additional blocks are changed while the optimal rectangles illustrated in FIGS. 3A–4C are being selected.

If any of the blocks having crosshatching in FIG. 5A are at the head of the changed block list when processing of the lower group begins, the blocks outlined with double lines in FIG. 5A will be selected as the first optimal rectangle in the lower group. Depending which of the remaining blocks was detected first and assuming no other blocks have changed, either the rectangle indicated by double lines in FIG. 5B or the rectangle indicated by double lines in FIG. 5C will be transmitted, followed by the other rectangle in these two figures. Finally, if either of blocks M13 or M14 were the first blocks to be detected as having changed in the lower group of blocks, the first optimal rectangle will be as indicated by the double lines in FIG. 6A. As indicated, the blocks in column M having a counter value lower than the threshold 2 which are closest to blocks M13 and M14 are M11 and M15. This defines the upper and lower boundaries of the optimal rectangle. All of the blocks in column N have a counter value lower than the threshold, thus defining the right-hand boundary, while block J14 has a counter value of 1, thus defining the left-hand boundary of the optimal rectangle. If one of the blocks outlined in double lines in FIG. 6B was detected as having changed before block J13, the three blocks J11, K11 and L11 will be transmitted next, followed by block J13; otherwise, J13 will be next followed by these three blocks.

It may not be immediately apparent from FIG. 6B why only these three blocks are sent together and block J13 is sent by itself, as was the case in the previous examples. It is not immediately apparent from the counter values illustrated in FIG. 6B why only three blocks are transmitted in one group and only a single block by itself after the optimal rectangle indicated by double lines in FIG. 6A is transmitted. The counter values have been illustrated as unchanging in FIGS. 3D–6B, since it has been assumed that no further changes have been detected. However, in the preferred embodiment, blocks included in an optimal rectangle are removed in step 38 (FIG. 2A) from the changed block list (DirtyList) and inserted into the return list after the blocks are transmitted in step 44 (FIG. 2B). When the next optimal rectangle is selected, the counter values are re-calculated. As a result, assuming that the upper group of changed blocks is transmitted first and no new changed blocks have been detected, after the optimal rectangle indicated by the double lines in FIG. 6A has been transmitted, the counter values will be as indicated in FIG. 6C, not as indicated in FIG. 6B. As indicated in FIG. 6C, the rectangle indicated by double lines is surrounded by blocks having counter values of 1 (except on the corners), as is block J13. All other blocks, other than these four blocks, have a counter value of 0, because they have not changed since they were transmitted to the remote device. The direction of the hatching on the blocks which were changed in FIG. 6A, but have been transmitted at the time illustrated in FIG. 6C, is perpendicular to the previously used hatching (with the exception of the blocks which were assumed to be at the head of the changed block list (DirtyList) for the lower group in FIGS. 6A–6C) to aid in understanding why the counter values are as indicated.

As noted above, other ways of selecting an optimal rectangle could be used, so that the smallest possible rectangle including all of the blocks in the lower group is found, rather than the smallest possible rectangle containing blocks with counter values higher than the threshold level that are adjacent to the reference element. This would be more efficient in use of CPU resources, but require that a larger number of unchanged blocks be transmitted. If processor power is more abundantly available than data transmission bandwidth, this alternative method could be used. All that would be required would be to search in the reference row for the closest block to the left and the right having a counter value lower than the threshold level, as done in the preferred embodiment, and then to go up and down one row at a time, checking to see if any of the blocks outside the current left-most and right-most positions have a counter value higher than the threshold level, and if so, checking the blocks to the left and the right of the left-most and right-most blocks, respectively, in that row to see if either of these blocks have a counter value higher than the threshold. If so, scanning continues to the left and the right of these blocks, respectively, until a counter value lower than the threshold level is found and the left-most and right-most positions are reset for the next row. Using this method, the size of the rectangle is continuously expanded, until all blocks outside the rectangle contain counter values lower than the threshold level. This could result in extremely sparse blocks which is one of the reasons that the preferred embodiment does not use this technique. Other methods of finding an optimal rectangle may also be used, resulting in rectangles larger than that of the preferred embodiment and smaller than that of the alternative embodiment described above.

After an optimal rectangle has been determined by performing the steps illustrated in FIG. 5A, the video memory corresponding to the blocks in the optimal rectangle is read and stored temporarily in a buffer. In the event that all or substantially all of the blocks in the screen have been changed, sufficient memory must be reserved for the temporary buffer to store a copy of all of the blocks on the display screen. However, the remaining data structures used are a small fraction of the size of the video memory; thus, the method according to the present invention is considerably more efficient than the delta buffer technique described above. The screen data in the temporary buffer is compressed using a conventional method and transferred to the remote display, together with the pointers or range of pointers identifying where the data should be displayed on the screen.

The values computed in step 28 (FIG. 2A) using, e.g., CRC64, may also be transmitted with the screen data. The local and remote computer systems can then cache the screen data, the pointers and the computed values, to further reduce the amount of data to be transmitted and compression/decompression processing. If the local system has cached a computed value matching the computed value for a block data to be transmitted, the pointer to the block which generated the computed value and the computed value can be transmitted to the remote computer system and the cached decompressed data corresponding to that computed value can be displayed in the block pointed to by the pointer data. Data caching in this manner results in quicker display with minimal bandwidth requirements, but will of course increase memory requirements by the amount of memory used for the cache.

The microfiche appendix provides an example of how the flowcharts illustrated in FIGS. 2A, 2B and 5A can be implemented, using MICROSOFT Foundation Classes (MFC) in C++. In the exemplary source code of the microfiche appendix, the grid list, wait list, changed block list (DirtyList) and return list are linked lists which are defined by the CObList class in MFC. Other classes in MFC that are used in the exemplary source code include class CDC for representing the display screen as a Device Context (drawing surface). The data displayed on the screen resides in an object from the CBitmap class which encapsulates a Windows Graphics Device Interface (GDI) bit map and provides member functions to manipulate the bit map.

The many features and advantages of the present invention are apparent from the detailed specification, and thus it is intended by the appended claims to cover all such features and advantages of the automatic switch system which fall within the true spirit and scope of the invention. Further, since numerous modifications and changes will readily occur to those skilled in the art from the disclosure of this invention, it is not desired to limit the invention to the exact construction and operation illustrated and described. Other suitable modifications and equivalents may be resorted to, as falling within the scope and spirit of the invention.

What is claimed is:

1. A method of transmitting display data from a first display to a second display, comprising:
   segmenting the first display into predefined blocks, each block containing a plurality of pixels;
   calculating and storing first values, each representing all of the pixels in a corresponding block;
   calculating second values, each representing all of the pixels in the corresponding block, after passage of time during which the pixels may have changed; and
   transmitting changed blocks from the first display to the second display when the first and second values for the changed blocks are unequal.

2. A method as recited in claim 1, further comprising:
   setting the first values of the changed blocks to the second values of the changed blocks after said transmitting; and
   comparing the first and second values,
   wherein said calculating of the second values and said comparing of the first and second values are performed repeatedly, and
   wherein said transmitting of the changed blocks and said setting of the first values are performed when said comparing detects a difference between the first and second values.

3. A method as recited in claim 1, wherein said calculating produces a cyclic redundancy code for each of the first and second values.

4. A method as recited in claim 3, wherein the cyclic redundancy code has 32 bits.

5. A method as recited in claim 3, wherein the cyclic redundancy code uses 64 bits.

6. A method as recited in claim 1, wherein said method is performed by a data processing system controlled by a multithreaded operating system, and
   wherein said calculating of the second values is performed by a first thread and said transmitting of the changed blocks is performed by a second thread separate from the first thread.

7. A method as recited in claim 6, wherein the data processing system has a first display memory to store the display data displayed by the first display, and said method further comprises:
   storing identifiers of the changed blocks by the first thread when differences between the first and second values of the changed blocks is detected; and
   reading the contents of the changed blocks from the display memory by the second thread based on the identifiers stored by the first thread to obtain the contents of the changed blocks for transmission.

8. A method as recited in claim 7, wherein said storing of the identifiers arranges the identifiers with a least recently detected changed block corresponding to a first identifier next accessed by the second thread.

9. A method as recited in claim 7, further comprising removing, by the second thread, transmitted block identifiers stored by the first thread when the changed blocks corresponding to the transmitted block identifiers are transmitted by the second thread.

10. A method as recited in claim 9, wherein said transmitting includes selecting by the second thread a plurality of adjacent changed blocks to be transmitted together.

11. A method as recited in claim 10,
    wherein said selecting includes determining by the second thread a rectangle containing only the adjacent changed blocks and unchanged blocks adjacent to at least two of the changed blocks, and
    wherein said transmitting by the second thread includes encoding the contents of all of the blocks in the rectangle to obtain encoded data; and
    transmitting the encoded data.

12. A method as recited in claim 11, wherein said removing of the transmitted identifiers removes only the identifiers of the adjacent changed blocks and if any of the identifiers remain, the first identifier next accessed by the second thread corresponds to the least recently detected changed block of the identifiers remaining.

13. A method as recited in claim 7, wherein said transmitting includes selecting by the second thread a plurality of adjacent changed blocks to be transmitted together.

14. A method as recited in claim 13,
    wherein said selecting includes determining by the second thread a rectangle containing only the adjacent changed blocks and unchanged blocks adjacent to at least two of the changed blocks, and
    wherein said transmitting by the second thread includes encoding the contents of all of the blocks in the rectangle to obtain encoded data; and
    transmitting the encoded data.

15. A method as recited in claim 7,
    wherein said calculating of the second values by the first thread is performed repeatedly for the blocks, further comprising:
    repeatedly comparing the first and second values by the first thread;
    storing the identifiers of the changed blocks in a first location by the first thread;
    storing the identifiers of the changed blocks in a first location by the first thread when said comparing determines that the first and second values are different;
    moving the identifiers at the first location to a second location by the first thread, at a time decided by predetermined criteria; and
    sending a signal from the first thread to the second thread informing the second thread that the identifiers were moved to the second location, and
    wherein said reading of the contents of the changed blocks by the second thread is based on the identifiers stored in the second location.

16. A method as recited in claim 15, wherein the predetermined criteria include a period of time started when a first identifier of one of the changed blocks is stored in the first location without the identifiers of any previously detected changed blocks stored in the first location, and ended before said moving of the identifiers from the first location to the second location.

17. A method as recited in claim 16, wherein the predetermined criteria include performing said comparing for all of the blocks of the first display including said comparing resulting in the first identifier being stored in the first location, before said moving of the identifiers from the first location to the second location.

18. A method as recited in claim 15, wherein the predetermined criteria include performing said comparing for all of the blocks of the first display before said moving of the identifiers from the first location to the second location, starting with an initial changed block having a first identifier to be stored in the first location without the identifiers of any previously detected changed blocks stored in the first location.

19. A method as recited in claim 1, wherein said transmitting includes selecting a plurality of adjacent changed blocks to be transmitted together.

20. A method as recited in claim 19,
wherein said selecting includes determining a rectangle containing only the adjacent changed blocks and unchanged blocks adjacent to at least two of the changed blocks, and
wherein said transmitting includes
encoding the contents of all of the blocks in the rectangle to obtain encoded data; and
transmitting the encoded data.

21. A method of maintaining a copy of a first display at a second display, comprising:
calculating and storing first values and identifiers in a grid list, each of the first values representing a plurality of pixels in one of a plurality of blocks into which the first display is segmented;
executing a first thread to repeatedly
calculate second values of the blocks having corresponding identifiers in the grid list, each of the second values representing a plurality of pixels in the one of the blocks after passage of time during which the pixels may have changed,
compare the second values with the first values stored in the grid list,
remove the identifiers of changed blocks from the grid list and store the identifiers and the second values of the changed blocks in a changed block list when differences between the first and second values of the changed blocks are detected, and
move the identifiers and the second values of the changed blocks from a return list to the grid list after data has been sent to the second display to update the copy of the first display to include the changed blocks; and
executing a second thread to repeatedly
remove the identifiers from the changed block list,
read the contents of the changed blocks from a display memory of the first display, based on the identifiers removed from the changed block list, to obtain the contents of the changed blocks for transmission,
transmit the data corresponding to the changed blocks to the second display, and
store the identifiers and the second values of the changed blocks in the return list after the data is transmitted to the second display.

22. A method as recited in claim 21, wherein the identifiers are removed from the grid list and stored in a wait list by the first thread as differences are detected between the first and second values of the changed blocks, and then the identifiers of the changed blocks are moved by the first thread from the wait list to the changed block list, with a timing based on predetermined criteria, with the identifiers stored in the changed block list arranged with a least recently detected changed block corresponding to a first identifier next removed by the second thread.

23. A method as recited in claim 21, wherein the predetermined criteria for moving the identifiers from the wait list to the changed block list include at least one of a period of time started when the identifier of one of the changed blocks is stored in the wait list without the identifiers of any previously detected changed blocks stored in the wait list and ended before the identifiers are moved from the wait list to the changed block list, and comparing all of the blocks of the first display before the identifiers are moved from the wait list to the grid list.

24. A method as recited in claim 21,
wherein said executing of the second thread further includes
determining a rectangle containing only adjacent changed blocks and unchanged blocks adjacent to at least two of the changed blocks, and
encoding the contents of all of the blocks in the rectangle to obtain the data to be transmitted to the second display, and
wherein only the identifiers of the adjacent changed blocks are removed from the changed block list after the contents of the blocks forming the rectangle are transmitted and if any of the identifiers remain in the changed block list, the first identifier next accessed by the second thread corresponds to the least recently detected changed block of the identifiers remaining.

25. A method as recited in claim 21, wherein each of the first and second values is a cyclic redundancy code.

26. A method as recited in claim 21,
wherein said executing of the second thread transmits the second values as part of the data corresponding to the changed blocks, and
wherein said method further comprises performing on a remote computer system
receiving and storing the data corresponding to the changed blocks,
displaying the changed blocks on the second display, and
maintaining a cache of the changed blocks for quick redisplay after a temporary change of the first display ends.

27. A system for maintaining a copy of a first display at a second display, comprising:
a storage unit to store first values and identifiers in a grid list, each of the first values representing a plurality of pixels in one of a plurality of blocks into which the first display is segmented;
a processor coupled to said storage unit and controlled by a multithreaded operating system to repeatedly
calculate by a first thread the first values and, after passage of time during which the pixels may have changed, second values of the blocks having corresponding identifiers in the grid list, each of the second values representing a plurality of pixels in the one of the blocks,
compare by the first thread the second values with the first values stored in the grid list, remove by the first thread the identifiers of changed blocks from the grid list and store the identifiers and the second values of the changed blocks in a changed block list when differences between the first and second values of the changed blocks are detected, move by the first thread the identifiers and the second values of the changed blocks from a return list to the grid list after data has been sent to the second display to update the copy of the first display to include the changed blocks, remove by a second thread the identifiers from the changed block list, read by the second thread the contents of the changed blocks from a display memory of the first display based on the identifiers removed from the changed block list to obtain the contents of the changed blocks for transmission, and store by the second thread the identifiers and the second values of the changed blocks in the return list after the data is sent to the second display; and a communication device, coupled to said processor, to transmit the data corresponding to the changed blocks to the second display.

28. A system for maintaining a copy of a first display screen on a second display screen, comprising:

a first display unit to display the first display screen;

a first display memory, coupled to said first display unit and segmented into blocks, to display contents of said first display memory as the first display screen;

a first storage unit to store first values, each representing a plurality of pixels in one of the blocks of the display memory;

a first processor, coupled to said first display memory and said first storage unit, to repeatedly calculate, after passage of time during which the pixels may have changed, second values, each representing a plurality of pixels in the one of the blocks of the display memory and to compare the first and second values;

a transmission line, coupled to said first processor, to transmit data representing changed blocks when the first and second values for the changed blocks are unequal;

a second display memory to store the contents of the blocks of said first display memory;

a second processor, coupled to said transmission line and said second display memory, to receive the data representing the changed blocks and to update the contents of the blocks of said first display memory based on the data received via said transmission line; and a second display unit to display the second display screen based on contents of said second display memory.

* * * * *